United States Patent
Caceres et al.

(10) Patent No.: US 11,196,680 B1
(45) Date of Patent: Dec. 7, 2021

(54) SYSTEMS AND METHODS FOR CONFIGURING AN APPLICATION PLATFORM USING RESOURCES OF A NETWORK

(71) Applicant: Verizon Patent and Licensing Inc., Basking Ridge, NJ (US)

(72) Inventors: Manuel Enrique Caceres, Basking Ridge, NJ (US); Umesh Kumar Gupta, Morris Plains, NJ (US); Jyotsna Kachroo, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/939,895

(22) Filed: Jul. 27, 2020

(51) Int. Cl.
*H04L 12/911* (2013.01)
*H04W 12/06* (2021.01)
*H04W 76/10* (2018.01)
*H04L 29/08* (2006.01)

(52) U.S. Cl.
CPC ............ *H04L 47/82* (2013.01); *H04L 67/141* (2013.01); *H04W 12/06* (2013.01); *H04W 76/10* (2018.02)

(58) Field of Classification Search
CPC ... H04L 47/82; H04L 67/141; H04L 41/0806; H04L 41/12; H04L 61/609; H04W 76/10; H04W 12/06
See application file for complete search history.

(56) References Cited

U.S. PATENT DOCUMENTS

| | | | |
|---|---|---|---|
| 2017/0366618 A1* | 12/2017 | Vrzic | H04L 67/148 |
| 2018/0192390 A1* | 7/2018 | Li | H04W 4/50 |
| 2018/0352050 A1* | 12/2018 | Li | H04W 8/08 |
| 2019/0104030 A1* | 4/2019 | Giust | H04L 41/0681 |
| 2019/0166634 A1* | 5/2019 | Ni | H04W 76/12 |
| 2020/0052991 A1* | 2/2020 | Kodaypak | H04L 47/801 |
| 2020/0396118 A1* | 12/2020 | Stockert | H04L 41/046 |

OTHER PUBLICATIONS

Ksentini et al., "Toward Sllicing-Enabled Multi-Acess Edge Computing in 5G", IEEE NEtwork, Mar./Apr. 2020.*
Chang et al., "MEC Architectural Implications for LTE/LTE-A Networks", MobiARch 2016, Oct. 2016, ACM Publishing.*

* cited by examiner

*Primary Examiner* — Todd L Barker

(57) ABSTRACT

A network device may determine, based on a provisioning request to host an application platform, a configuration of resources of a network for maintaining the application platform within the network. The network device may provision the resources to permit access to the application platform via a domain. The network device may receive, from a user device, a domain request that includes the domain, wherein the domain request is associated with configuring an application session between an application of the user device and the application platform. The network device may provide, to the user device, a response that includes an address of a host resource of the application platform, wherein the host resource is one of the resources. The network device may receive, from the user device, a session request that includes the address and may establish the application session between the user device and the host resource.

20 Claims, 10 Drawing Sheets

SYSTEMS AND METHODS FOR CONFIGURING AN APPLICATION PLATFORM USING RESOURCES OF A NETWORK

BACKGROUND

Multi-access edge computing (MEC) is a network architecture of MEC resources (e.g., devices, applications operating on devices, and/or the like) that may operate at an edge of a cellular network. The MEC resources may perform operations of the cellular network for connected user devices that are within a coverage area of the MEC resources.

DETAILED DESCRIPTION OF PREFERRED EMBODIMENTS

Figure 1A:
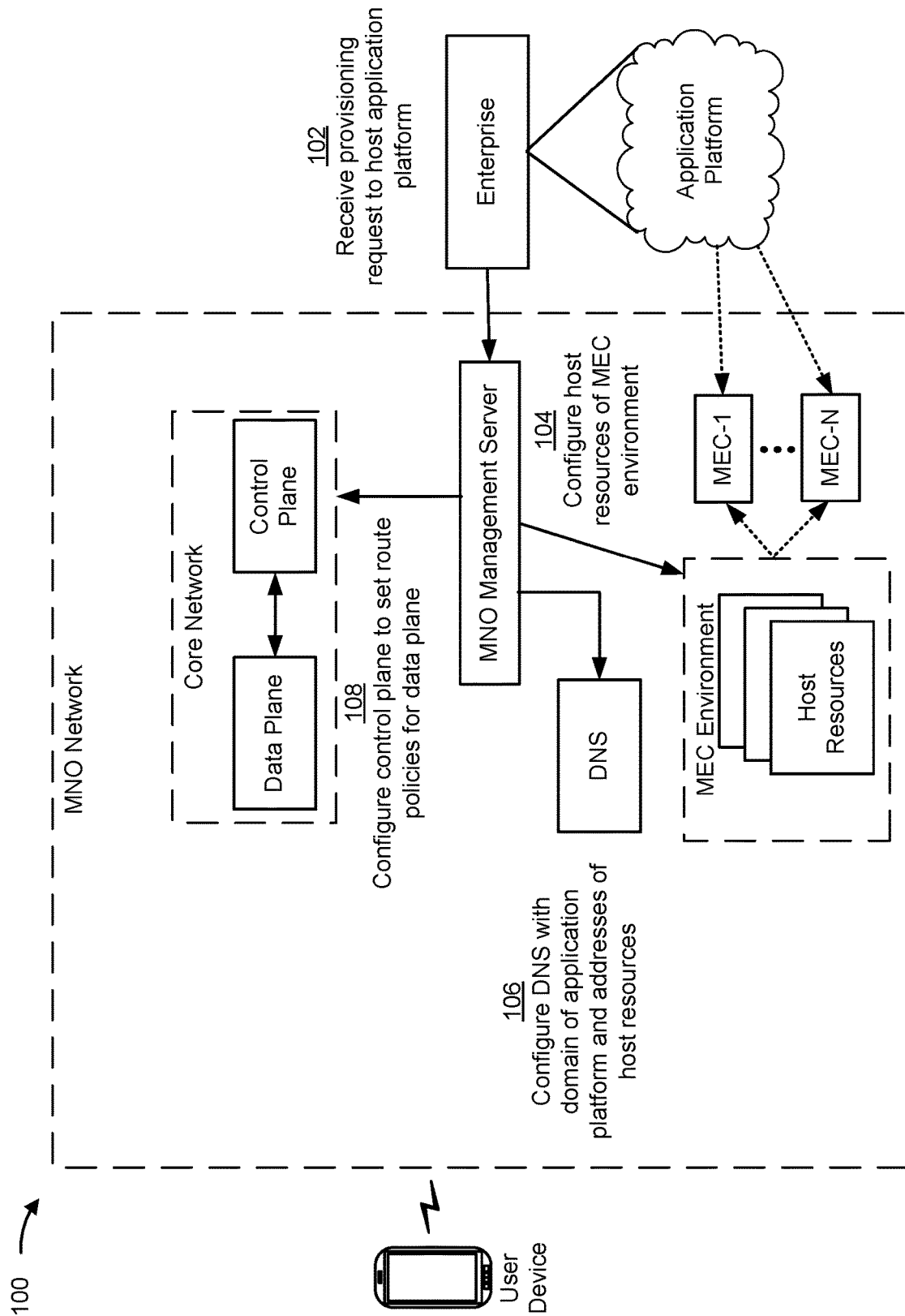
FIGS. 1A-1B are diagrams of an example implementation described herein.

The following detailed description of example implementations refers to the accompanying drawings. The same reference numbers in different drawings may identify the same or similar elements.

An application platform may provide and/or support applications (e.g., mobile applications) that are installed and run by user devices. Typically, the application platform is accessible to the user devices via a data network, such as the Internet. However, devices other than the user devices, including devices associated with bad actors, may be able to find (e.g., via a public listing of an address of the application platform) and may attempt to access the application platform. In some cases, the devices associated with bad actors may target the application platform with malicious attacks, such as denial of service attacks, which may overwhelm the server devices that host the application platform. This may impact a performance of the server devices and/or the application platform, which may cause the server devices to waste computing resources (e.g., processing resources, memory resources, networking resources, and/or the like) to identify and/or investigate the malicious attacks and/or rectify any damage that may result from the malicious attacks.

Some implementations described herein provide a mobile network operator (MNO) network that includes a MEC network that hosts an application platform. The MNO network may be separate from a data network, such as the Internet, and may be visible and/or accessible to only authorized user devices. In some implementations, an MNO management server of the MNO network may configure resources of the MNO network such that only user devices running applications associated with the application platform may communicate with the application platform via the MNO network. Further, the MNO management server may determine an identifier of each user device that is able to access the application platform and/or a location of the user device.

In this way, the application platform limits access to the application platform within the MNO network to known user devices (e.g., user devices that run applications associated with the application platform), which may reduce a likelihood that the application platform will be subject to malicious attacks by devices associated with bad actors (e.g., that are not authorized to access the MNO network). Moreover, because the MNO management server stores information identifying an identifier and a location of each user device that is authorized to access the application platform, the MNO management server may be able to quickly identify and block any authorized user device that attempts to perform malicious attacks on the application platform within the MNO network. This conserves computing resources (e.g., processing resources, memory resources, networking resources, and/or the like) of the MEC network that would otherwise be expended to identify and/or investigate the malicious attacks and/or rectify any damage that may result from the malicious attacks. Further, using a MEC network allows the application platform to be hosted by MEC servers of the MEC network that may be geographically near to user devices that run applications associated with the application platform. This reduces a latency associated with communicating traffic associated with the applications between the user devices and the application platform, which may improve a performance of the applications and/or the user devices running the applications.

Figure 1B:
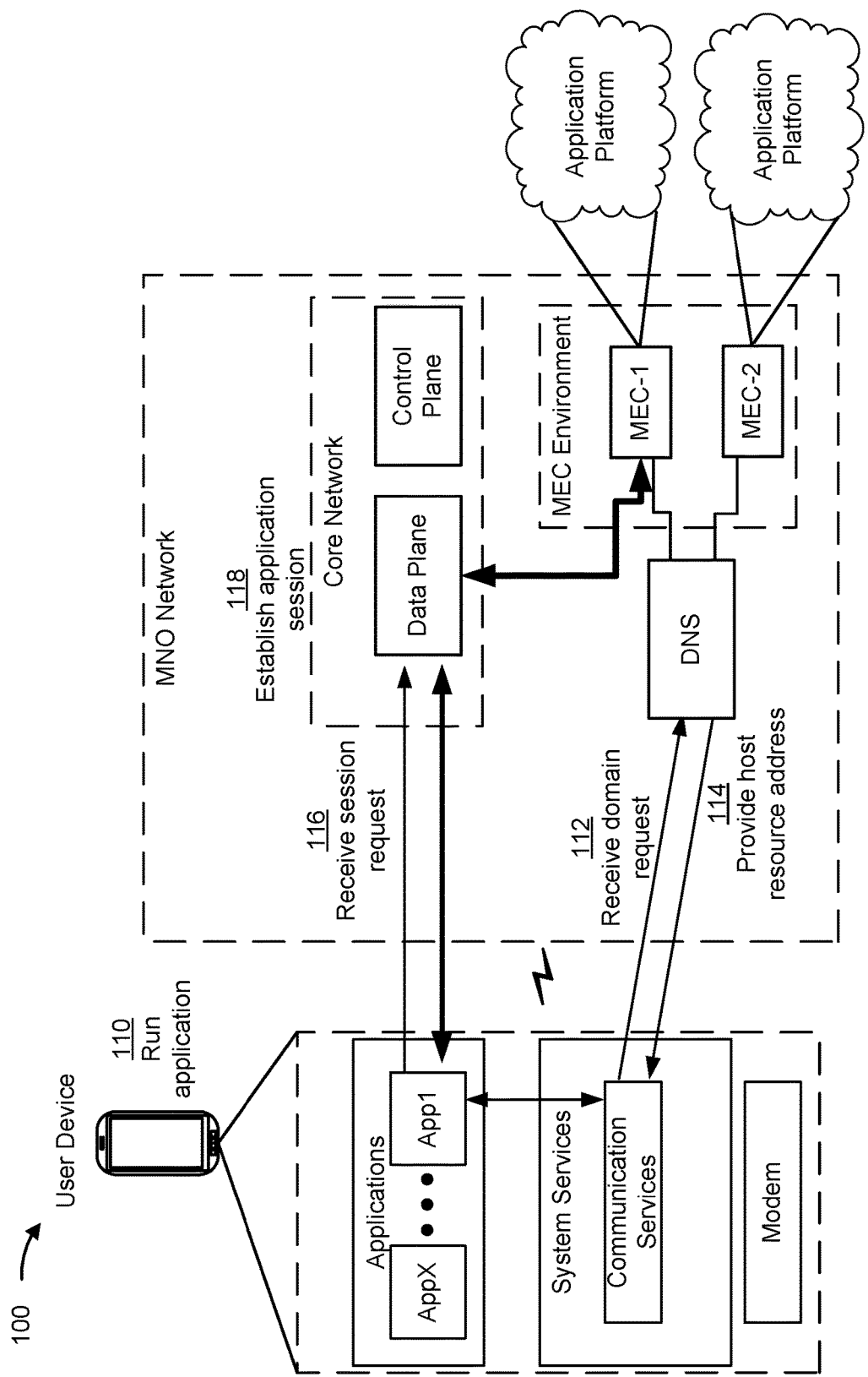

FIGS. 1A-1B are diagrams of an example implementation 100 associated with configuring an application platform using resources of a network. Example implementation 100 may be associated with a mobile network operator (MNO) network that includes an MNO management server that is configured to manage and/or provision resources of the MNO network. The resources of the MNO network may include a mobile edge computing (MEC) environment, a domain name system (DNS), a core network, and/or the like. The MEC environment may include one or more host resources, such as one or more MEC servers (shown in FIG. 1A as MEC-1 through MEC-N, where N≥1). The DNS may include a data structure for translating domains into network addresses (e.g., Internet protocol (IP) network addresses that are local to the MNO network) of the one or more host resources of the MEC environment. The core network may include a telecommunications core network, such as a 5G next generation core network (5GC), an LTE evolved packet core (EPC), and/or the like. The core network may include a data plane and a control plane.

Example implementation 100 is described in connection with an enterprise, which may be a private entity, such as a financial institution, a social media company, an online video game company, and/or the like. However, example implementation 100 may correspondingly apply to any other type of private entity (e.g., an entity that permits only authorized access to the entity's services). Furthermore, the enterprise may be a customer of a network service provider associated with the MNO network. The network service provider may provide communication services involved in providing the MNO network, as described herein. In some implementations, the enterprise may be associated with an application platform that provides and/or supports applications (e.g., mobile applications) that may be installed and run by user devices. A user device, such as the user device shown in FIGS. 1A-1B, may be configured to install and/or run one or more applications (shown in FIG. 1B as App1 through AppX, where X≥1) that are associated with the application platform, may include system services that include communication services (e.g., that facilitate sending or receiving traffic associated with the one or more applications), and may include a modem (e.g., to communicate with the MNO network).

As shown in FIG. 1A, and by reference number 102, the MNO management server may receive a provisioning request from the enterprise (e.g., via a computing device associated with the enterprise) to host the application platform within the MNO network. For example, the enterprise (e.g., via the computing device) may cause a communication session to be established with the MNO management server and may send the provisioning request to the MNO management server. The provisioning request may include location information indicating one or more locations (e.g., one or more geographic locations) where the application platform is to be hosted by the MNO network and/or available to user devices that run the one or more applications associated with the application platform.

In some implementations, based on the provisioning request, the MNO management server may configure (or cause to be configured) the resources of the MNO network to allow the MNO network to host and/or maintain the application platform within the MNO network. For example, the MNO management server may configure the host resources of the MEC environment, the DNS, and/or the core network of the MNO network, as described in detail herein in relation to reference numbers 104-108.

As shown in FIG. 1A, and by reference number 104, configuring the resources of the MNO network may include configuring the host resources of the MEC environment. For example, the MNO management server may cause a set of MEC servers of the one or more MEC servers to host the application platform. In some implementations, the MNO management server may identify a set of MEC servers that have available computing resources (e.g., available processing resources, memory resources, networking resources, and/or the like) to host the application platform.

In some implementations, the MNO management server may identify (e.g., based on the location information included in the provisioning request) one or more locations (e.g., geographic locations) associated with the application platform (e.g., one or more locations where users devices that run the one or more applications are expected to be able to communicate with the application platform). The MNO management server may identify a set of MEC servers, of the one or more MEC servers of the MEC environment, where each MEC server of the set is within a threshold distance of the one or more locations associated with the application platform. Accordingly, the MNO management server may cause the set of MEC servers to host the application platform (e.g., each MEC server hosts an instance of the application platform), which may allow the host application platform to be hosted at a plurality of different locations (e.g., at locations where user devices are likely to communicate with the application platform). In this way, some implementations described herein may minimize latency associated with an application session between a user device (e.g., that is running an application associated with the application session) and the application platform, which may reduce an amount of time the user device and the application platform need to communicate and may therefore improve a performance of the application running on the user device.

As further shown in FIG. 1A, and by reference number 106, configuring the resources of the MNO network may include configuring the DNS with a domain of the application platform and respective addresses (e.g., IP network addresses that are local to the MNO network) of the set of MEC servers that host the application platform. For example, the MNO management server may update the data structure to include, for each MEC server of the set of MEC servers, a mapping that indicates the domain of the application platform, the address of the MEC server, a location (e.g., a geographic location) of the MEC server, and/or the like.

As further shown in FIG. 1A, and by reference number 108, configuring the resources of the MNO network may include configuring the control plane of the core network. In some implementations, the MNO management server may configure the control plane to set route policies for the data plane. For example, the MNO management server may cause the control plane to update routing policies of the data plane to cause traffic associated with an application that is associated with the application platform (e.g., application session traffic that is generated by the user device that runs the application) to be routed to a MEC server of the set of MEC servers that host the application platform. In this way, the MNO management server may cause traffic associated with an application session between the user device (e.g., that is running the application) and the application platform to be routed within the MNO network.

As shown in FIG. 1B, and by reference number 110, the user device may run an application. For example, a user of the user device may interact with a user interface of the user device to select the application (e.g., that is installed on the user device), which may cause the application to open and run on the user device. The application may be associated with the application platform that is hosted by the MNO network (e.g., by the set of MEC servers of the MEC environment). In some implementations, installing the application on the user device causes the user device to be subscribed to the MNO network (e.g., installing the application causes the user device to obtain authorization information from the MNO management server that allows the user device to communicate with the MNO network related to running the application).

As further shown in FIG. 1B, and by reference number 112, the user device (e.g., when running the application) may send a domain request to the MNO network. For example, the user device may send the domain request to the DNS of the MNO network. The domain request may include a domain of the application, an identifier of the application, a location of the user device, the authorization information (e.g., that was obtained by the user device when installing the application), and/or the like. The user device may send the domain request to cause an application session between the user device and the set of MEC servers of the application platform to be established (e.g., for the application of the user device to communicate with the application platform of the set of MEC servers).

In some implementations, the user device may utilize the communication services and the modem of the user device to send the domain request to the MNO network. For example, the communication services of the user device may allow (e.g., based on the user device being subscribed to the MNO network) the user device to connect to a radio access network of the MNO network, which may allow the communication services of the user device to send the domain request to the MNO network via the modem of the user device. Additionally, or alternatively, the communication services of the user device may send, via the modem of the user device, the domain request to a session border controller (SBC) that is associated with another network (e.g., a telecommunications network of the network service provider that is associated with the MNO network) based on the user device being subscribed to the other network. The SBC of the other network may send the domain request to the DNS of the MNO network.

In some implementations, the DNS and/or another device of the MNO network, such as the MNO management server, may perform an authentication process associated with verifying whether the user device is authorized to communicate with the MNO network. For example, the DNS and/or the other device of the MNO network may process the authorization information included in the domain request using an authentication protocol, such as extensible authentication protocol that uses an authentication and key agreement (EAP-AKA), to verify whether the user device is authorized to communicate with the MNO network. When the DNS and/or the other device of the MNO network determines that the user device is not authorized to communicate with the MNO network, the DNS and/or the other device of the MNO network may cease attempting to establish the application session between the application and the application platform and/or may notify the user device that establishment of the application session has failed. When the DNS and/or the other device of the MNO network determines that the user device is authorized to communicate with the MNO network, the DNS and/or the other device of the MNO network may continue attempting to establish the application session as described herein in relation to reference numbers 114-118.

As further shown in FIG. 1B, and by reference number 114, the DNS and/or the other device of the MNO network may provide a host resource address of the MEC environment to the user device (e.g., based on the domain request). For example, the DNS and/or the other device of the MNO network may determine (e.g., based on information included in the domain request) a location (e.g., a geographic location) of the user device and an identifier of the application running on the user device. The DNS and/or the other device of the MNO network may search the data structure of the DNS, based on the location of the user device and the identifier of the application, to identify a MEC server, of the set of MEC servers that hosts the application platform associated with the application, that is within a threshold distance of the location of the user device (e.g., a MEC server that is geographically near the user device). The DNS and/or the other device of the MNO network may send the address (e.g., IP network address that is local to the MNO network) of the MEC server to the user device. For example, the DNS and/or the other device of the MNO network may send the address of the MEC server to the communication components of the user device (e.g., via the modem of the user device), which may provide the address of the MEC server to the application running on the user device.

As further shown in FIG. 1B, and by reference number 116, the user device (e.g., in response to receiving the host resource address) may send a session request to the MNO network. For example, the user device may send the session request to the core network of the MNO network via the data plane of the core network. The session request may include the host resource address (e.g., the IP network address the MEC server that is local to the MNO network). In some implementations, the user device may utilize the communication services and the modem of the user device to send the session request to the MNO network. For example, the communication services of the user device may allow the user device to send via the modem of the user device the session request to the data plane of the core network of the MNO network.

As further shown in FIG. 1B, and by reference number 118, the MNO network may establish (e.g., based on the session request) the application session between the application and the MEC server. For example, the data plane and/or another device of the MNO network, such as the MNO management server, may identify the address of the MEC server in the session request and may cause, based on identifying the address of the MEC server, the application session to be established between the user device and the MEC server (e.g., to allow the application running on the user device to communicate with the application platform hosted on the MEC server).

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

FIGS. 2A-2D are diagrams of an example implementation 200 associated with configuring an application platform using resources of a network. Example implementation 200 may be associated with an MNO network that includes an MNO management, a MEC environment, a core network, and/or the like as described herein in relation to FIGS. 1A-1B. In some implementations, example implementation may be described in connection with an enterprise and/or a user device, as described herein in relation to FIGS. 1A-1B.

Figure 2A:
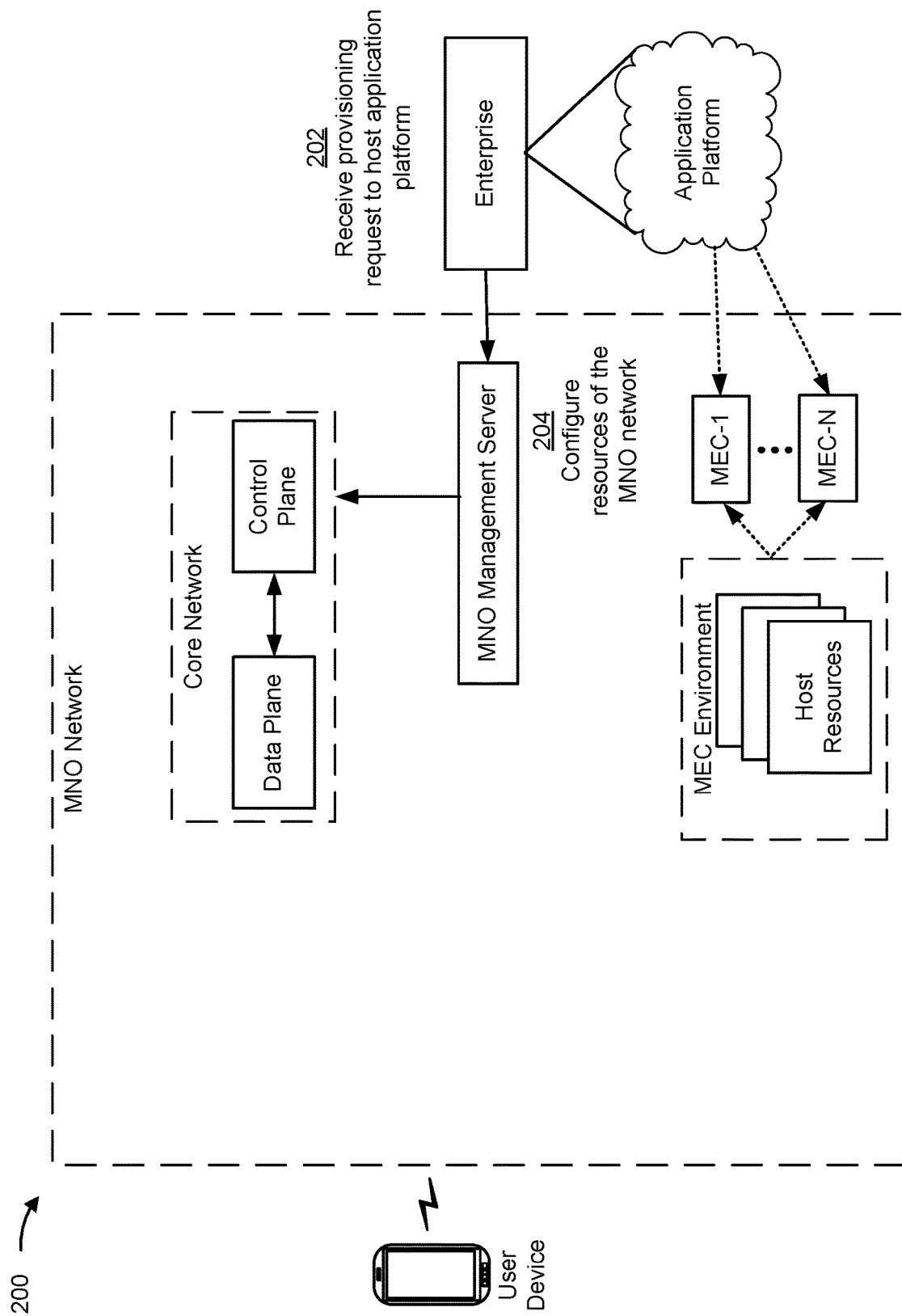
FIGS. 2A-2D are diagrams of an example implementation described herein.

As shown in FIG. 2A, and by reference number 202, the MNO management server may receive a provisioning request from the enterprise to host an application platform (e.g., associated with the enterprise) within the MNO network (e.g., in a similar manner as described herein in relation to FIG. 1A and reference number 102). The provisioning request may include information identifying one or more applications (e.g., that are to be run by user devices) associated with the application platform, information identifying one or more user devices that are to communicate with the application platform (e.g., when running the one or more applications), and/or the like. The information identifying the one or more applications may include a list that indicates a respective identifier of the one or more applications (e.g., one or more application identifiers). The information identifying the one or more user devices may include a whitelist (e.g., a list of allowed user devices), a blacklist (e.g., a list of blocked user devices), and/or the like, that indicates a respective identifier (e.g., a respective mobile directory number (MDN), mobile station international subscriber directory number (MSISDN), international mobile subscriber identity (IMSI), international mobile equipment identity (IMEI), and/or the like) associated with allowed and/or block user devices.

As further shown in FIG. 2A and by reference number 204, based on the provisioning request, the MNO management server may configure (or cause to be configured) the resources of the MNO network to allow the MNO network to host and/or maintain the application platform within the MNO network. For example, the MNO management server may configure the host resources of the MEC environment and/or the core network of the MNO network, as described herein in relation to FIG. 1A and reference numbers 104-108.

In some implementations, the MNO management server may update a data structure (not shown) associated with the core network (e.g., included in the core network and/or accessible to the core network) to include the information identifying the one or more applications associated with the application platform, the information identifying one or more user devices that are to communicate with the application platform, and/or the like.

Figure 2B:
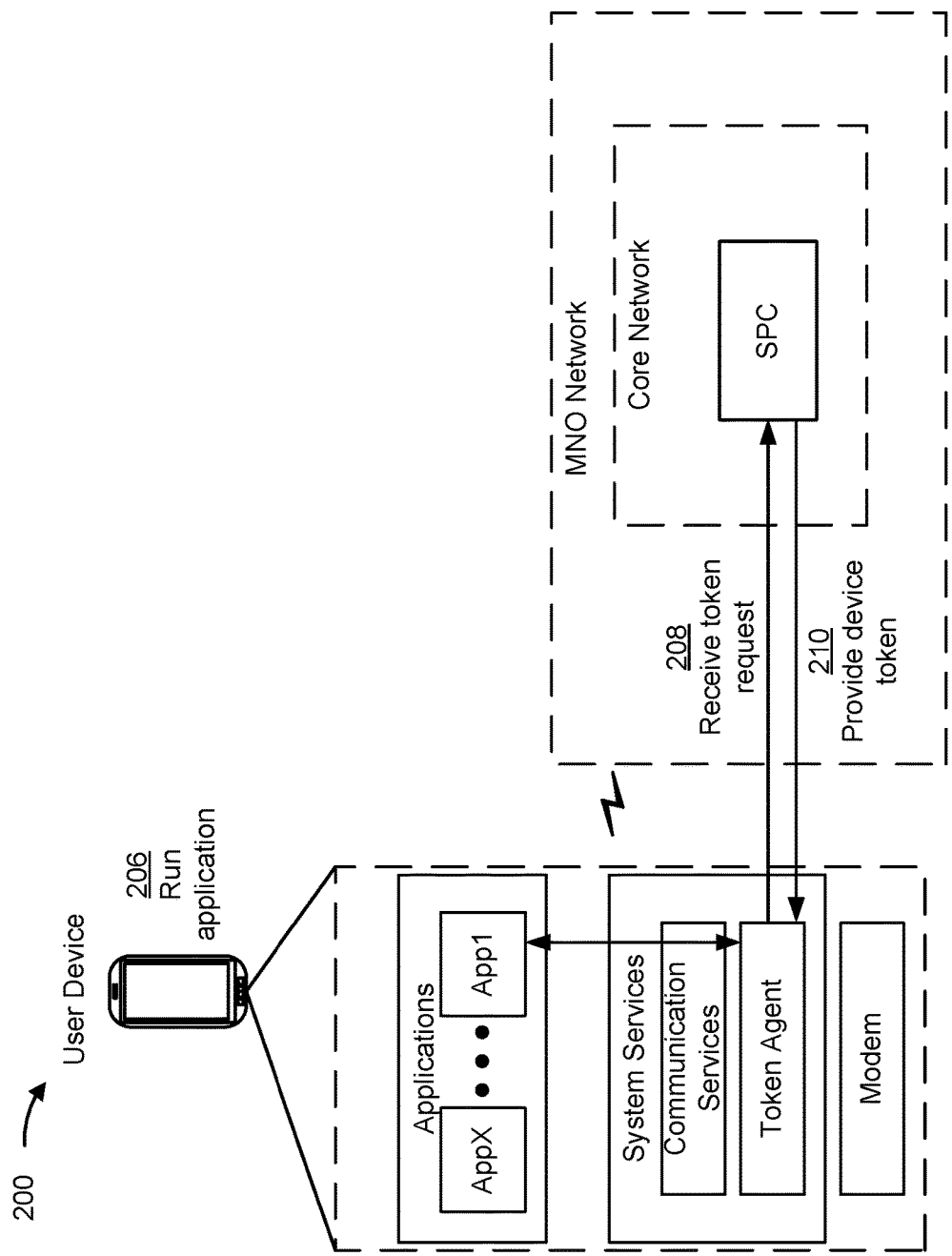

As shown in FIG. 2B, and by reference number 206, the user device may run an application (e.g., of the one or more applications associated with the application platform that is hosted by the MNO network) in a similar manner as described herein in relation to FIG. 1B and reference number 110. In some implementations, installing the application on the user device causes the user device to obtain information identifying the MNO network (e.g., installing the application causes the user device to obtain information identifying a subscriber profiler controller (SPC) of the MNO network). In some implementations, the SPC may be included in and/or associated with the core network of the MNO network.

The application may request a device token from a token agent associated with the user device based on the user device running the application. For example, the application may call an application programming interface (API) exposed by code available in the user device from the MNO. In some implementations, the token agent is included in the system services of the user device. In some implementations, the token agent is included in a subscriber identity module (SIM) of the user device.

The token agent may receive the request from the application and may determine whether the application is authorized to request the device token. The token agent may access a data structure (not shown) storing information identifying applications that are authorized to request a device token. The token agent may determine whether the application is authorized to request the device token based on the information stored in the data structure.

In some implementations, the token agent determines that the application is not authorized to request the device token. For example, the token agent may determine that the application is not authorized to request the device token based on the data structure not including information identifying the application. In these implementations, the token agent may provide a response denying the request to the application. The application may receive the response and may perform one or more actions based on the response, such as providing a notification to the user, re-requesting the device token from the token agent, utilizing a set of default settings to access the application platform, and/or the like.

In some implementations, the token agent determines that the application is authorized to request the device token. For example, the token agent may determine that the application is authorized to request the device token based on the data structure including information identifying the application.

The token agent may generate a token request based on determining that the application is authorized to request the device token. The token request may include information identifying a device identifier associated with the user device (e.g., an MDN, an MSISDN, an IMSI, an IMEI, and/or the like) and an application identifier that uniquely identifies the application within the MNO network (e.g., that identifies the application as one of the one or more applications associated with the application platform).

In some implementations, the token agent generates the token request based on verifying that the user device is associated with a valid SIM associated with the MNO network. For example, the token agent may verify that the user device is associated with a valid SIM associated with the MNO network based on performing an extensible authentication protocol, authentication key agreement (EAP-AKA) procedure. The token agent may generate the token request and/or may provide the token request to the SPC associated with the core network of the MNO network based on verifying that the user device is associated with a valid SIM.

As shown by reference number 208, the SPC receives the token request from the user device. The SPC may generate the device token for the application based on the request. In some implementations, the SPC may generate the device token based on a token string. The token string may include the application identifier and/or information identifying the user device (e.g., the MSISDN, the IMSI, the IMEI, and/or the like). The SPC may store information associating the token string with the application identifier and/or the information identifying the user device in a data structure stored in a memory associated with the SPC.

As shown by reference number 210, the SPC provides the device token to the user device. The token agent may receive the device token from the SPC. The token agent may provide the device token to the application to enable the user to access the application via the application platform.

Figure 2C:
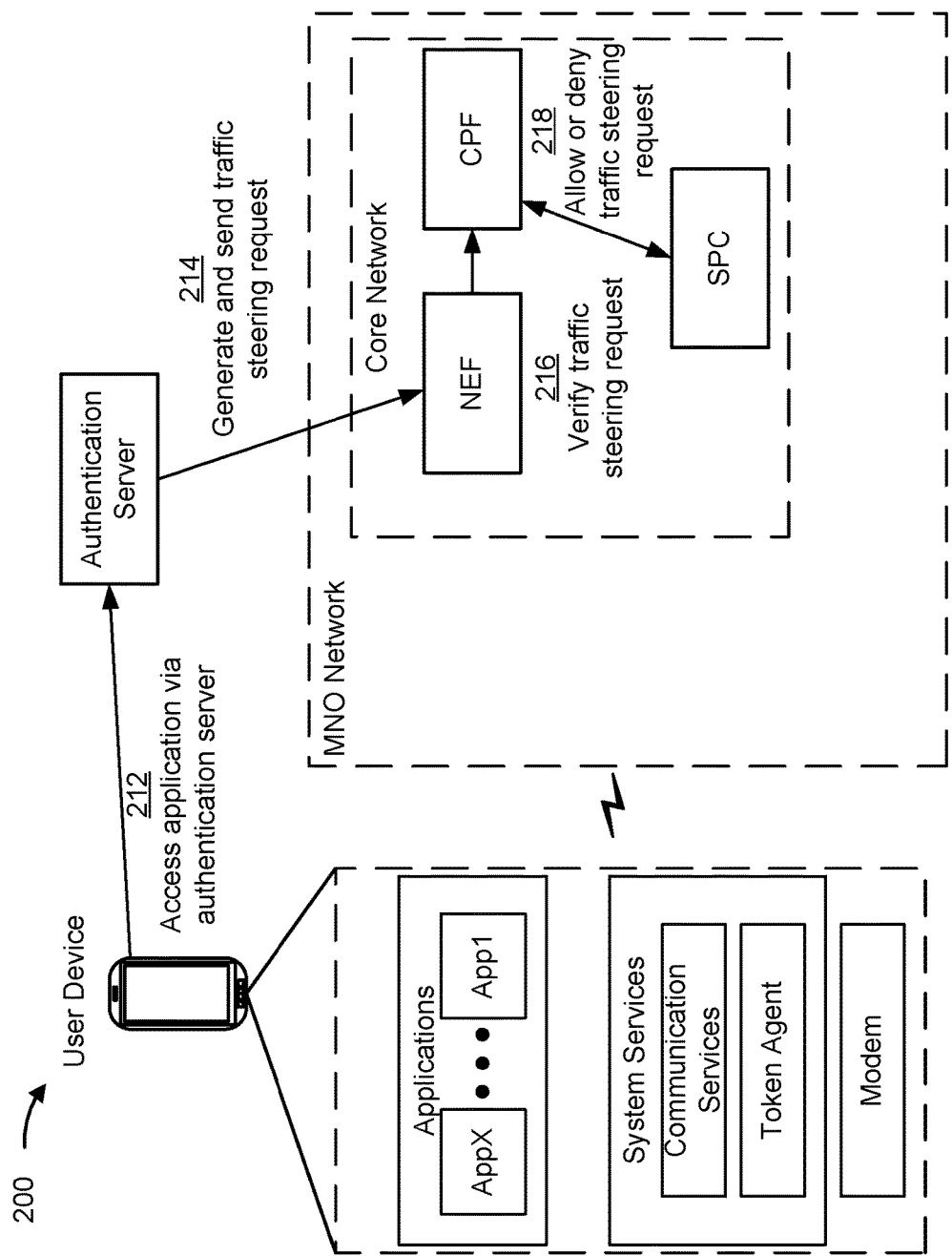

As further shown in FIG. 2C and reference number 212, the user utilizes the user device to access the application via an authentication server of the application platform (e.g., an instance of the application platform hosted outside of the MNO network, such as on the Internet). For example, the user may utilize the user device to log in to the application via the authentication server. The user may input authorization credentials (e.g., a username, a password, and/or the like) via a user interface provided by the application. The application may receive the authorization credentials and may provide the authorization credentials and the device token to the authentication server. The authentication server may receive the authorization credentials and may utilize the authorization credentials to authenticate the user and/or the application.

As shown by reference number 214, the authentication server, based on authenticating the user and/or the application, may generate a traffic steering request for an application session associated with the user device. The traffic steering request may include the device token, information identifying a destination of application traffic (e.g., an IP address of a host resource of the application platform outside of the MNO network), information identifying the MNO network (e.g., respective addresses of the host resources of the MEC environment of the MNO network), and/or the like. The authentication server may provide the traffic steering request to a network device included in the core network associated with the MNO network. For example, the application platform may provide the traffic steering request to a network exposure function (NEF) device included in the core network.

As shown by reference number 216, the NEF, or another network device of the core network of the MNO network, may verify that the traffic steering request is legitimate (e.g., may verify that the traffic steering request originated from the authentication server). For example, the traffic steering request may include an identifier of the authentication server and/or an authorization credential and the NEF may verify the authentication server based on the identifier and/or the authorization credential (e.g., in a similar manner to that described elsewhere herein).

In some implementations, the NEF, or the other network device of the core network, may forward (e.g., after verifying that the traffic steering request is legitimate) the traffic steering request to a component associated with the control plane of the core network, such as the SPC. The NEF may forward the traffic steering request to the SPC via a control plane function (CPF) of the core network. The SPC may utilize the device token to identify the user device associated with the application session. In some implementations, the SPC may obtain the device token from the traffic steering request and may validate the device token for the application session. For example, the SPC may validate the device token for the application session based on the token string. The SPC may extract the token string from the device token and may determine that the token string is associated with a valid device token. The SPC may utilize the token string to obtain information identifying the user device based on the token string being associated with a valid device token. For example, the SPC may utilize the device token to obtain information identifying the user device from the data structure (e.g., that is associated with a memory of the SPC) storing the information identifying the user device.

In some implementations, the SPC may validate the device token for the application session based on the information identifying the user device. Additionally, or alternatively, as shown by reference number 218, the SPC may determine whether the user device is listed on a whitelist or blacklist (e.g., that is stored in a data structure of the MNO management server) to determine whether to allow or deny the traffic steering request. If the whitelist and/or the blacklist indicate that the user device is to be allowed, the SPC may allow the traffic steering request. Otherwise, the SPC may deny the traffic steering request.

Figure 2D:
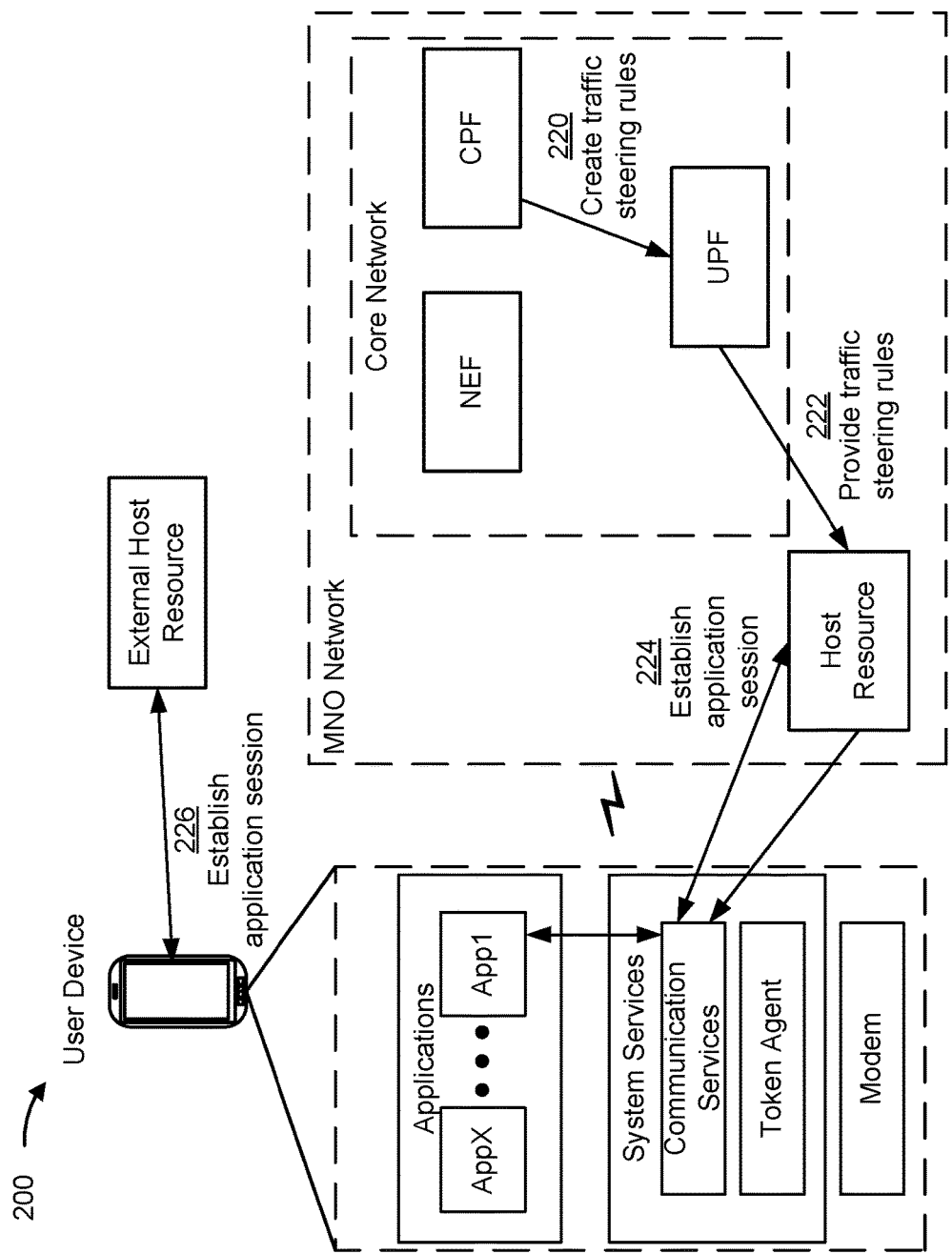

As shown in FIG. 2D and by reference number 220, the CPF (e.g., when the SPC allows the traffic steering request) may create traffic steering rules for a user plane function (UPF), or another network device of the core network, to allow the UPF to steer network traffic associated with the application session. The traffic steering rules may include information identifying the UPF, information identifying the MNO network as a destination for the application session (e.g., identifying a host resource addresses of the MEC environment of the MNO network), and/or the like. As shown by reference number 222, the CPF (e.g., via the UPF) may provide the traffic steering rules to a host resource of the MNO network, which provides the traffic steering rules to the user device (e.g., via the modem of the user device). For example, the host resource of the MNO network may send the traffic steering rules to the communication components of the user device (e.g., via the modem of the user device), which may provide the traffic steering rules to the application running on the user device.

The application may determine, based on the traffic steering rules, that the host resource of the MNO network is the destination of the application session. Accordingly, as shown by reference number 224, the application may send a session request to the MNO network to cause the application session to be established between the user device and the host resource of the MNO network. In some implementations, the user device may utilize the communication services and the modem of the user device to send the session request to the MNO network. In some implementations, the UPF may determine, based on the session request, that a traffic steering rule exists for the user device and may allow the application session to be established between the user device and the host resource of the MNO network. Accordingly, after the application session is established, traffic associated with the application session may be routed by the UPF and/or other network devices of the core network of the MNO network.

Alternatively, as shown by reference number 226, the CPF (e.g., when the SPC denies the traffic steering request) may not create any traffic steering rules for the UPF, or another device of the core network, and thereby prevents network traffic associated with the application session from being steered within the MNO network. In some implementations, the user device may send a session request to the MNO network and the UPF may determine, based on the session request, that a traffic steering rule does not exist for the user device and may prevent the application session from being established between the user device and a host resource of the MNO network. Accordingly, the user device may cause the application session to be established with an external host resource of the application platform (e.g., outside of the MNO network), instead of the host resource of the MNO network. Accordingly, any traffic associated with the application session may be routed outside of the MNO network.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
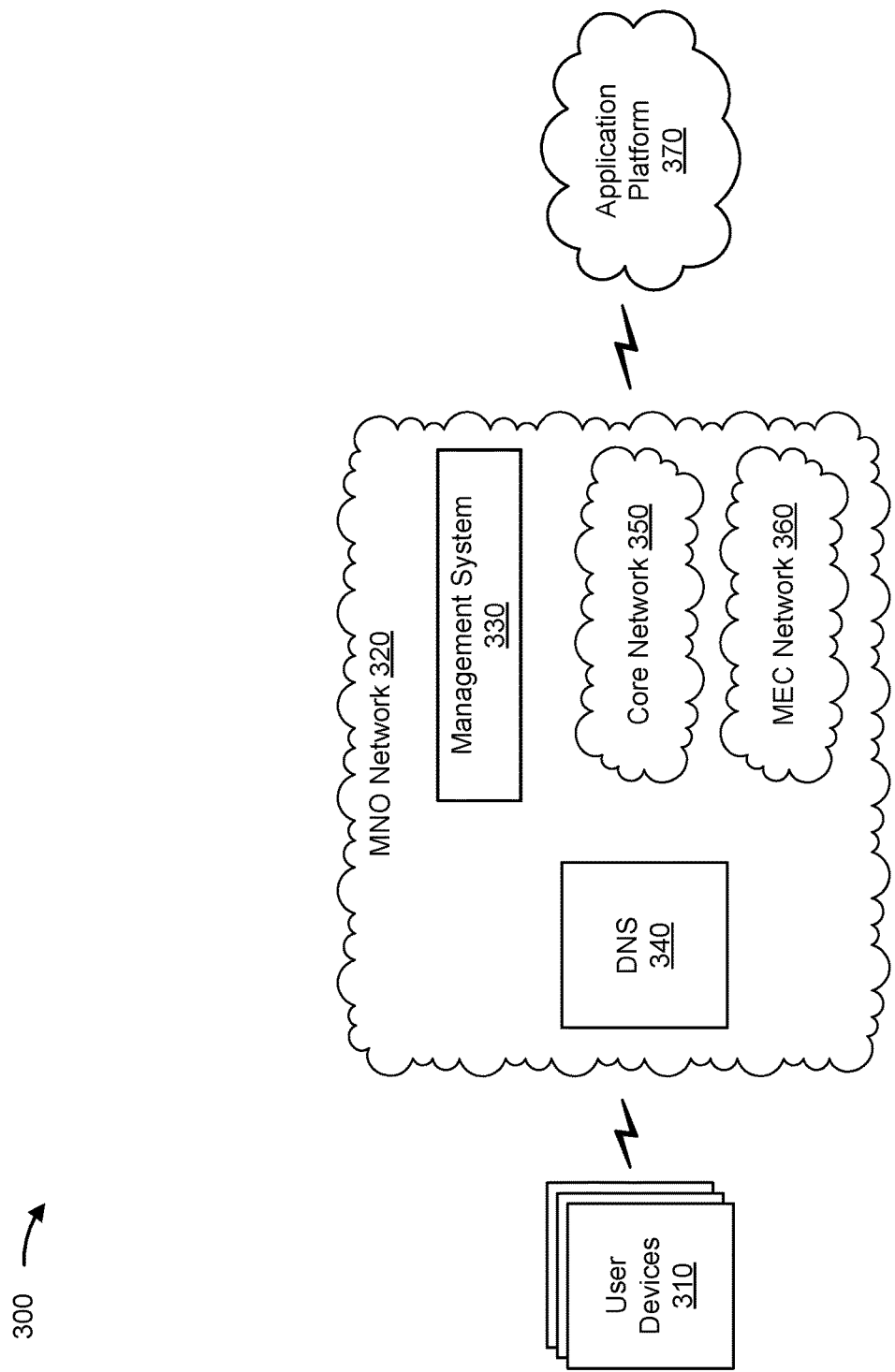
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more user devices 310, an MNO network 320, a management system 330, a DNS 340, a core network 350, a MEC network 360, and an application platform 370. Devices of environment 300 may interconnect via wired connections, wireless connections, or a combination of wired and wireless connections.

User device 310 includes one or more devices capable of receiving, generating, storing, processing, and/or providing information described herein. For example, user device 310 may include a communication and/or computing device, such as a mobile phone (e. g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

MNO network 320 includes one or more wired and/or wireless networks. For example, MNO network 320 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. MNO network 320 enables communication among the devices of environment 300. MNO network 320 may correspond to the MNO network of example implementation 100.

Management system 330 includes one or more devices, components, or functions to manage MNO network 320, core network 350, MEC network 360, and/or the like. For example, management system 330 may include one or more devices, components, or functions for provisioning and/or management of resources of the MNO network 320. Management system 330 may correspond to the MNO management server of example implementation 100.

DNS 340 may include a one or more devices, such as one or more server devices, capable of translating domains into network addresses. For example, DNS 340 may include a device capable of determining, storing, receiving, and/or sending information that identifies a network address (e.g., an IP address local to the MNO network), associated with a host resource of MEC network 360, based on a domain associated with an application. While DNS 340 is shown as being external to management system 330, core network 350, and/or MEC network 360, in some implementations, DNS 340 may be included in management system 330, core network 350, and/or MEC network 360.

Core network 350 may include various types of core network architectures, such as a 5G core network (e.g., shown in FIG. 4), an LTE EPC, and/or the like. In some implementations, core network 350 may be implemented on physical devices, such as gateways, mobility management entities, and/or the like. In some implementations, the hardware and/or software implementing core network 350 can be virtualized (e.g., through the use of network functions virtualization and/or software-defined networking), thereby allowing for the use of composable infrastructure when implementing core network 350. In this way, networking, storage, and compute resources can be allocated to implement the functions of core network 350 in a flexible manner as opposed to relying on dedicated hardware and software to implement these functions. Core network 350 may be managed by management system 330.

MEC network 360 includes one or more wired and/or wireless networks. For example, MEC network 360 may include a cellular network (e.g., a long-term evolution (LTE) network, a code division multiple access (CDMA) network, a 3G network, a 4G network, a 5G network, another type of next generation network, and/or the like), a PLMN, a LAN, a WAN, a MAN, a telephone network (e.g., the PSTN), a private network, an ad hoc network, an intranet, the Internet, a fiber optic-based network, a cloud computing network, and/or the like, and/or a combination of these or other types of networks. In some implementations, MEC network 360 may include one or more host resources, such as one or more MEC servers, that host application platform 370. MEC network 360 may be managed by management system 330.

Application platform 370 includes one or more devices that provides and/or supports applications that may be installed and run on user devices 310. In some implementations, application platform 370 may be designed to be modular such that certain software components may be swapped in or out depending on a particular need. As such, application platform 370 may be easily and/or quickly reconfigured for different uses. In some implementations, application platform 170 may be hosted by one or more host resources of MEC network 360.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
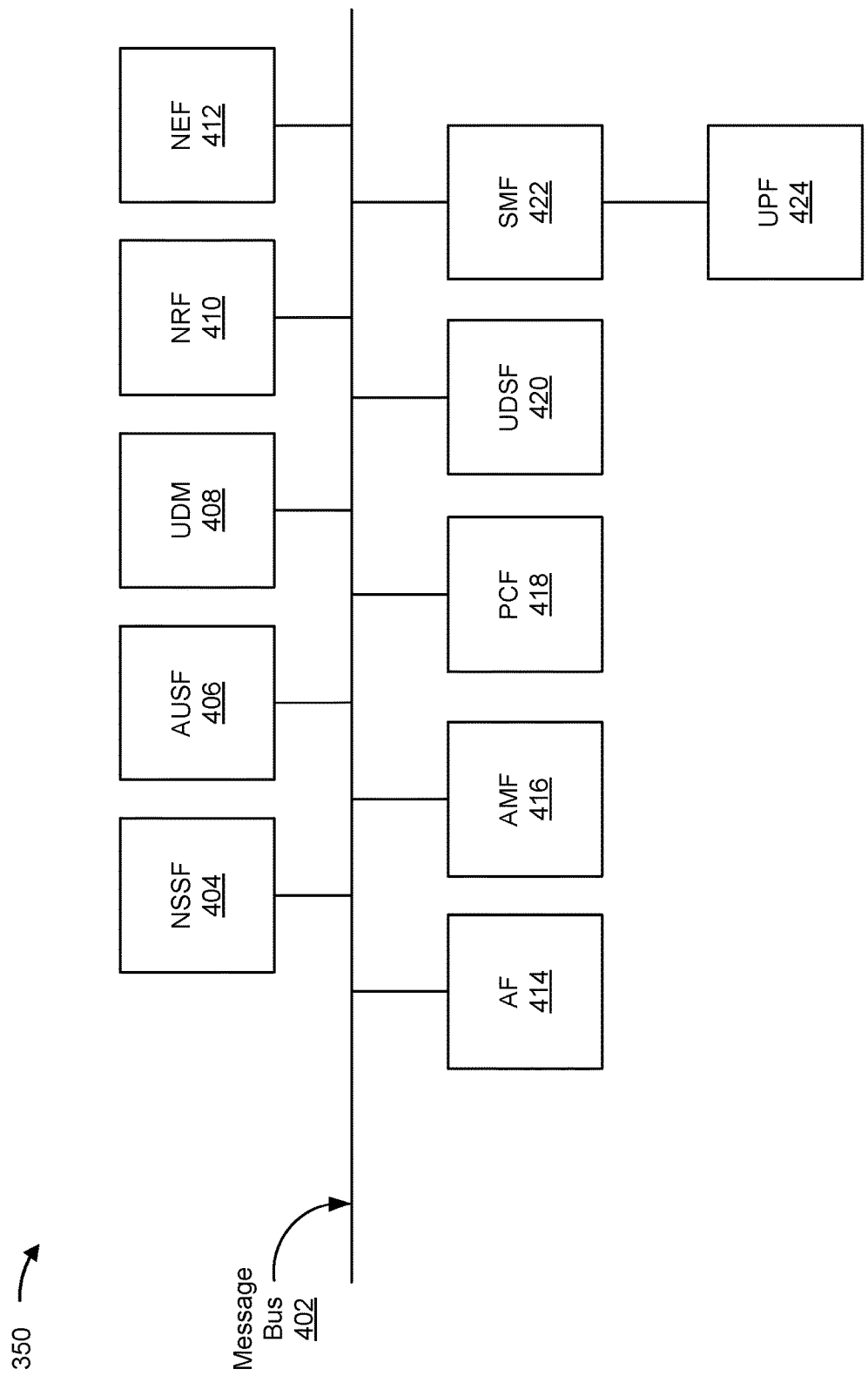
FIG. 4 is a diagram of an example core network described herein.

As shown in FIG. 4, core network 350 may include a number (or quantity) of functional elements. The functional elements of core network 350 may communicate via a message bus 402. As shown in FIG. 4, the functional elements may include, for example, an NSSF 404, an authentication server function (AUSF) 406, a unified data management (UDM) function 408, a network function repository function (NRF) 410, a network exposure function (NEF) 412, an application function (AF) 414, an AMF 416, a policy control function (PCF) 418, an unstructured data storage function (UDSF) 420, a session management function (SMF) 422, a user plane function (UPF) 424, and/or the like. As shown, these functional elements may be communicatively connected via message bus 402.

Each of the functional elements shown in FIG. 4 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

Message bus 402 represents a communication structure for communication among the functional elements. In other words, message bus 402 may permit communication between two or more functional elements of core network 350.

NSSF 404 is a hardware-based element that may select network slice instances (NSIs) for UEs (and/or may determine network slice policies to be applied at a RAN). By providing network slicing, NSSF 404 allows an operator to deploy multiple substantially independent end-to-end networks potentially with the same infrastructure. In some implementations, each slice may be customized for different services.

AUSF 406 includes one or more devices that act as an authentication server and support the process of authenticating UEs in the wireless telecommunications system. UDM 408 includes one or more devices that store subscriber data and profiles in the wireless telecommunications system. UDM 408 can be used for fixed access, mobile access, and/or the like, in core network 350.

NRF 410 includes one or more devices that that may interface with NEF 412 to provide AMF 416 with group messages. NRF 410 may enable the functional elements of core network 350 to discover and communicate with one another via message bus 402. NEF 412 includes one or more devices that that may support the exposure of capabilities and/or events in the wireless telecommunications system to help other entities in the wireless telecommunications system discover network services. For example, NEF 412 may support the exposure of group messages that may be provided via a group messaging service.

AF 414 includes one or more devices that that may support application influence on traffic routing, access to NEF 412, policy control, and/or the like. In some implementations, AMF 416 may be a hardware-based element that may act as a termination point for Non-Access Stratum (NAS) signaling, mobility management, and/or the like. AMF 416 can provide authentication and authorization of UEs and mobility management. PCF 418 includes one or more devices that provide a policy framework that incorporates network slicing, roaming, packet processing, mobility management, and/or the like.

UDSF 420 includes one or more data structures configured to store information, mappings, and/or the like associated with the core network 350. For example, UDSF 420 may include one or more tables, mappings, graphs, and/or the like of resources, NSIs, slice deployment description (SDDs), and/or the like, as described herein.

SMF 422 includes one or more devices that may support the establishment, modification, and release of communication sessions in the wireless telecommunications system. For example, SMF 422 may configure traffic steering policies at UPF 424, enforce UE IP address allocation and policies, and/or the like. AMF 416 and SMF 422 can act as a termination point for NAS signaling, mobility management, and/or the like.

UPF 424 includes one or more devices that may serve as an anchor point for intra/inter-RAT mobility. UPF 424 may apply rules to packets, such as rules pertaining to packet routing, traffic reporting, handling user plane QoS, and/or the like.

The number and arrangement of functional elements shown in FIG. 4 are provided as an example. In practice, there may be additional functional elements, fewer functional elements, different functional elements, or differently arranged functional elements than those shown in FIG. 4. Furthermore, two or more functional elements shown in FIG. 4 may be implemented within a single device, or a single functional element shown in FIG. 4 may be implemented as multiple, distributed devices. Additionally, or alternatively, a set of functional elements (e. g., one or more functional elements) of core network 350 may perform one or more functions described as being performed by another set of functional elements of core network 350.

Figure 5:
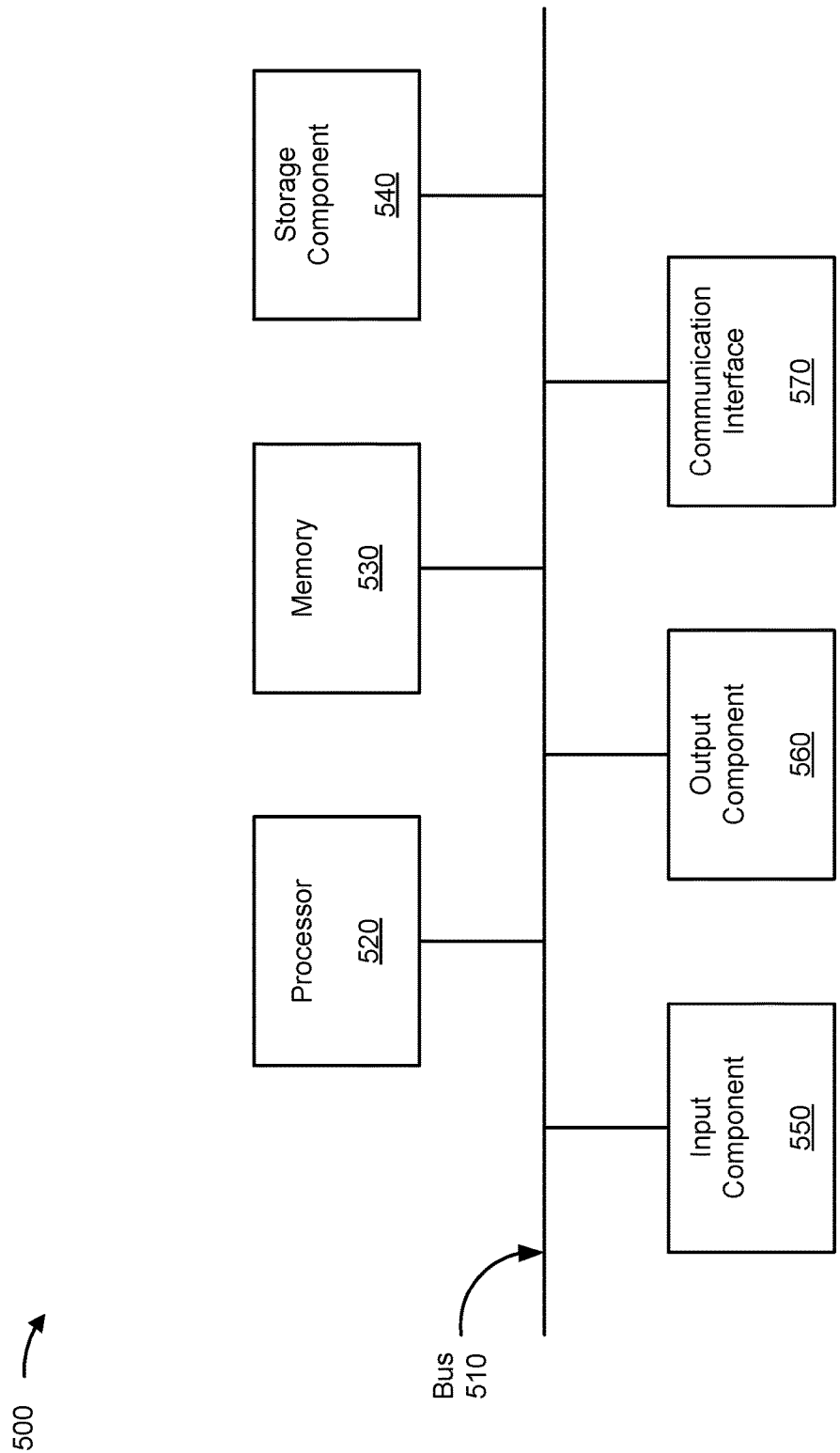
FIG. 5 is a diagram of example components of one or more devices of FIGS. 3-4.

FIG. 5 is a diagram of example components of a device 500, which may correspond to user device 310, management system 330, DNS 340, NSSF 404, AUSF 406, UDM 408, NRF 410, NEF 412, AF 414, AMF 416, PCF 418, UDSF 420, SMF 422, and/or UPF 424. In some implementations, user device 310, management system 330, DNS 340, NSSF 404, AUSF 406, UDM 408, NRF 410, NEF 412, AF 414, AMF 416, PCF 418, UDSF 420, SMF 422, and/or UPF 424 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory), a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
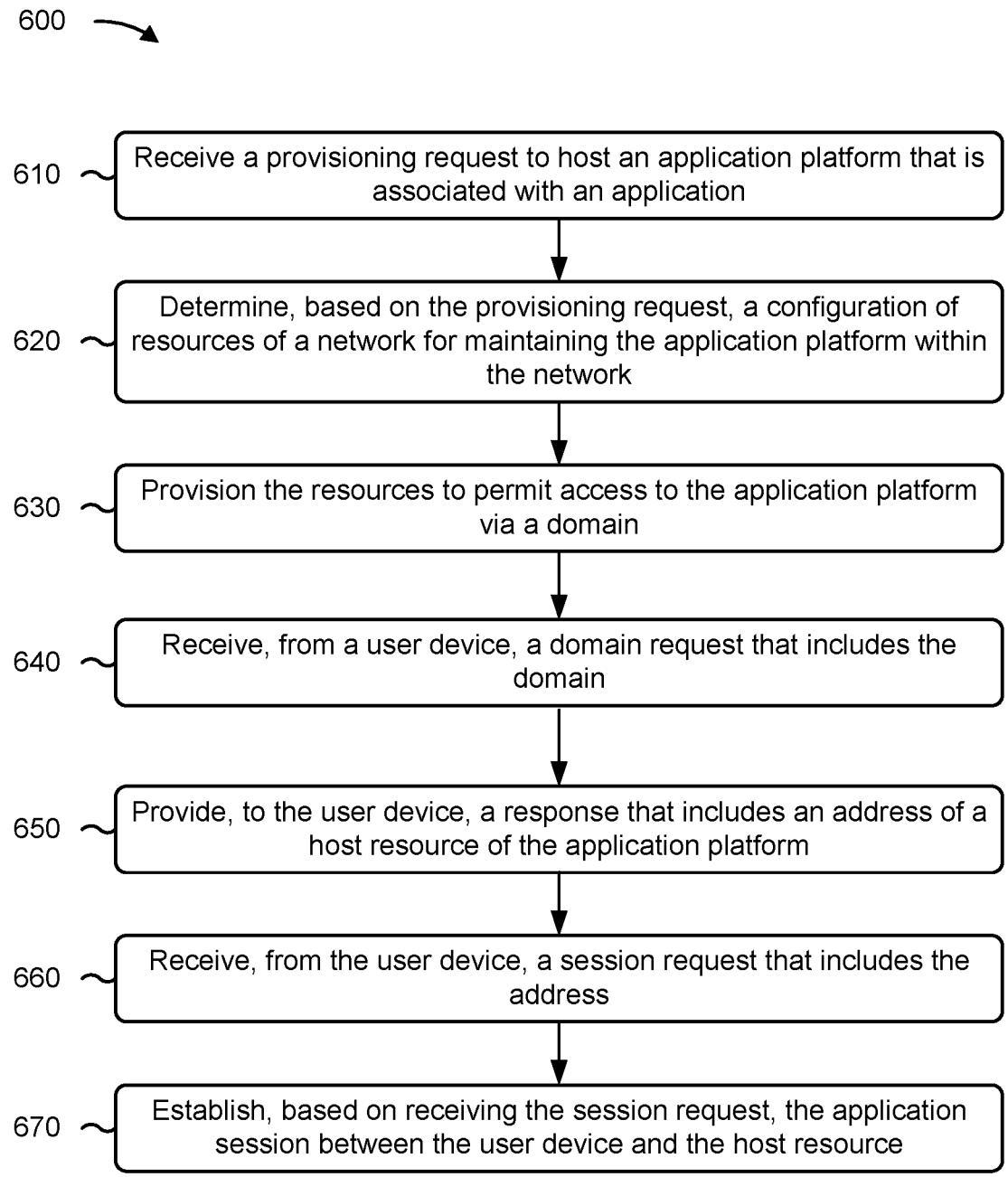
FIG. 6 is a flow chart of an example process relating to configuring an application platform using resources of a network.

FIG. 6 is a flow chart of an example process 600 associated with configuring an application platform using resources of a network. In some implementations, one or more process blocks of FIG. 6 may be performed by a network device (e.g., management system 330). In some implementations, one or more process blocks of FIG. 6 may be performed by another device or a group of devices separate from or including the network device, such as a user device (e.g., user device 310), a DNS (e.g., DNS 340), and/or another network device (e.g., NSSF 404, AUSF 406, UDM 408, NRF 410, NEF 412, AF 414, AMF 416, PCF 418, UDSF 420, SMF 422, UPF 424, and/or the like). Additionally, or alternatively, one or more process blocks of FIG. 6 may be performed by one or more components of a device 500, such as processor 520, memory 530, storage component 540, input component 550, output component 560, communication component 570, and/or the like.

As shown in FIG. 6, process 600 may include receiving a provisioning request to host an application platform that is associated with an application (block 610). For example, the network device may receive a provisioning request to host an application platform that is associated with an application, as described above.

As further shown in FIG. 6, process 600 may include determining, based on the provisioning request, a configuration of resources of a network for maintaining the application platform within the network (block 620). For example, the network device may determine, based on the provisioning request, a configuration of resources of a network for maintaining the application platform within the network, as described above. The resources may include mobile edge computing (MEC) resources of a MEC network, a domain name system, a control plane of the network, and a data plane of the network.

In some implementations, determining the configuration of resources comprises identifying location information in the provisioning request that indicates a location the application platform is to be hosted; identifying available MEC resources (e.g., server devices) associated with the location, and determining the configuration of resources based on the available MEC resources, wherein the host resource corresponds to one of the available MEC resources.

As further shown in FIG. 6, process 600 may include provisioning the resources to permit access to the application platform via a domain (block 630). For example, the network device may provision the resources to permit access to the application platform via a domain, as described above.

In some implementations, provisioning the resources comprises configuring the MEC resources to host the application platform at a plurality of different locations of the MEC resources; configuring the domain name system to provide the address of the host resource based on a location of the host resource, and causing the control plane to update routing policies of the data plane to cause traffic associated with the application session to be routed to the host resource.

Configuring the domain name system may include selecting, based on a location of the user device, a host resource from a set of host resources; identifying that the address is associated with the host resource; and providing the address to the user device. Additionally, or alternatively, configuring the domain name system may include updating the domain name system by mapping a domain of the application platform to the local addresses of the set of host resources to cause the domain name system to provide a local address to the user device based on receiving a domain request from the user device that includes the domain and location of the user device. In some implementations, configuring the domain name system may include updating the domain name system to, prior to providing a local address to the user device, perform an authentication process to verify whether the user device is authorized to communicate via the network, wherein the domain name system is configured to provide the local address based on the authentication process verifying that the user device is authorized to communicate via the network.

As further shown in FIG. 6, process 600 may include receiving, from a user device, a domain request that includes the domain (block 640). For example, the network device may receive, from a user device, a domain request that includes the domain, as described above. In some implementations, the domain request is associated with configuring an application session between an application of the user device and the application platform.

In some implementations, the domain request is received in association with the application being installed on the user device. Additionally, or alternatively, the domain request is received via a radio access network of the network based on the user device being subscribed to the network and/or the domain request is received via a session border controller (SBC) that is associated with another network based on the user device being subscribed to the other network.

As further shown in FIG. 6, process 600 may include providing, to the user device, a response that includes an address of a host resource of the application platform (block 650). For example, the network device may provide, to the user device, a response that includes an address of a host resource of the application platform, as described above. In some implementations, the host resource is one of the resources. The address may comprise a local IP address of the host resource.

As further shown in FIG. 6, process 600 may include receiving, from the user device, a session request that includes the address (block 660). For example, the network device may receive, from the user device, a session request that includes the address, as described above.

In some implementations, prior to receiving the session request, process 600 may include performing an authentication process associated with verifying whether the user device is authorized to communicate with the network, wherein the authentication process is associated with the user device sending a domain request to a domain name system of the network, and wherein the application session is established based on the authentication process verifying that the user device is authorized to communicate with the network.

As further shown in FIG. 6, process 600 may include establishing, based on receiving the session request, the application session between the user device and the host resource (block 670). For example, the network device may establish, based on receiving the session request, the application session between the user device and the host resource, as described above.

In some implementations, process 600 includes updating, based on the configuration of the plurality of host resources, a domain name system to map the plurality of host resources to a domain that is associated with the application platform, wherein the domain name system is configured to, based on the host resource being mapped to the domain, provide the address of the host resource in response to a domain request from the user device that was received prior to the session request.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a provisioning request to host an application platform that is associated with an application;
   determining, by the network device and based on the provisioning request, a configuration of resources of a network for maintaining the application platform within the network,
     wherein the resources include mobile edge computing (MEC) resources and a domain name system;
   provisioning, by the network device, the resources to permit access to the application platform via a domain;
   receiving, by the network device and from a user device, a domain request that includes the domain;
   receiving, by the network device, a request from a token agent associated with the user device;
   generating, by the network device and based on the request from the token agent associated with the user device, a device token for the application based on at least one of: an application identifier or information identifying the user device;
   providing, by the network device, the device token to the token agent to enable access to the application via the application platform;
   providing, by the network device and to the user device, a response that includes an address of a host resource of the application platform,
     wherein the host resource comprises one of the MEC resources; and
   receiving, by the network device and from the user device, a session request that includes the address; and
   establishing, by the network device and based on receiving the session request, an application session between the user device and the host resource.

2. The method of claim 1, wherein determining the configuration of resources comprises:
   identifying location information in the provisioning request that indicates a location where the application platform is to be hosted;
   identifying available MEC resources, of the MEC recourses, associated with the location; and
   determining the configuration of resources based on the available MEC resources,
     wherein the host resource corresponds to one of the available MEC resources.

3. The method of claim 1, wherein:
   the domain request is associated with configuring the application session between the application of the user device and the application platform, and
   the domain request is received in association with the application being installed on the user device.

4. The method of claim 1, wherein the domain request is received via a radio access network of the network based on the user device being subscribed to the network.

5. The method of claim 1, wherein the domain request is received via a session border controller (SBC) that is associated with another network based on the user device being subscribed to the other network.

6. The method of claim 1, wherein the resources further includes, a control plane of the network and a data plane of the network.

7. The method of claim 6, wherein provisioning the resources comprises:
configuring the MEC resources to host the application platform at a plurality of different locations of the MEC resources;
configuring the domain name system to provide the address of the host resource based on a location of the host resource; and
causing the control plane to update routing policies of the data plane to cause traffic associated with the application session to be routed to the host resource.

8. A network device, comprising:
one or more processors configured to:
determine a configuration of a plurality of host resources of a network to host an application platform within the network,
wherein the plurality of host resources comprises a plurality of server devices of a mobile edge computing (MEC) network of the network;
provision the plurality of host resources to host the application platform;
cause a control plane of the network to update routing policies of a data plane of the network based on traffic including a local address associated with one or more of the host resources;
receive, from a user device, a session request associated with an application of the application platform to establish an application session with a host resource of the plurality of host resources;
receive, from the user device, a request from a token agent associated with the user device;
generate, based on the request, a device token for the application based on at least one of: an application identifier or information identifying the user device;
provide the device token to the token agent to enable access to the application via the application platform; and
establish, using the data plane and based on an address of the host resource from the session request, the application session between the user device and the application platform.

9. The network device of claim 8, wherein the one or more processors, when determining the configuration of the plurality of host resources, are configured to:
identify available MEC resources of the network; and
determine the configuration of the plurality of host resources based on the available MEC resources,
wherein the host resource corresponds to one of the available MEC resources.

10. The network device of claim 9, wherein the one or more processors are further configured to:
prior to identifying the available MEC resources, determine location information associated with where the application is to be hosted; and
identify the available MEC resources based on the location information.

11. The network device of claim 8, wherein the one or more processors are further configured to:
update, based on the configuration of the plurality of host resources, a domain name system to map the plurality of host resources to a domain that is associated with the application platform,
wherein the domain name system is configured to, based on the host resource being mapped to the domain, provide the address of the host resource in response to a domain request from the user device that was received prior to the session request.

12. The network device of claim 8, wherein the one or more processors are further configured to:
prior to receiving the session request, perform an authentication process associated with verifying whether the user device is authorized to communicate with the network,
wherein the authentication process is associated with the user device sending a domain request to a domain name system of the network, and
wherein the application session is established based on the authentication process verifying that the user device is authorized to communicate with the network.

13. The network device of claim 8, wherein the address comprises a local Internet protocol (IP) address of the host resource.

14. A communication system, comprising:
a data plane of a network;
a control plane of the network;
a domain name system associated with the network;
a plurality of host resources,
wherein the plurality of host resources comprises a plurality of server devices of a mobile edge computing (MEC) network of the communication system;
a provisioning server configured to:
receive a provisioning request to host an application platform associated with an application;
select, based on location information associated with the provisioning request, a set of host resources, of the plurality of host resources, to host the application platform;
provision the set of host resources to host the application platform;
update the domain name system to provide, to user devices that are running the application, local addresses of the set of host resources; and
cause the control plane to update routing policies of the data plane based on traffic including the local addresses to facilitate application sessions between the user devices and the application platform; and
a subscriber profiler controller configured to:
receive a request from a token agent associated with a user device of the user devices;
generate, based on the request, a device token for the application based on at least one of: an application identifier or information identifying the user device; and
provide the device token to the token agent to enable access to the application via the application platform.

15. The communication system of claim 14, wherein the provisioning server, when updating the domain name system, is configured to:
update the domain name system to provide, based on receiving a domain request from the user device of the user devices, a first local address of the local addresses by:
selecting, based on a location of the user device, a host resource from the set of host resources;
identifying that the first local address is associated with the host resource; and
providing the first local address to the user device.

16. The communication system of claim 14, wherein the provisioning server, when updating the domain name system, is configured to:
update the domain name system by mapping a domain of the application platform to the local addresses of the set of host resources to cause the domain name system to provide one or more of the local addresses to the user devices based on receiving domain requests from the user devices that include the domain and locations of the user devices.

17. The communication system of claim 14, wherein the provisioning server, when updating the domain name system, is configured to:
    update the domain name system to, prior to providing the local addresses to the user devices, perform an authentication process to verify whether the user devices are authorized to communicate via the network,
    wherein the domain name system is configured to provide the local addresses based on the authentication process verifying that the user devices are authorized to communicate via the network.

18. The communication system of claim 14, wherein:
    the set of host resources are associated with one or more locations identified in the location information; and
    the local addresses comprise Internet protocol (IP) addresses of the set of host resources that are local to the network.

19. The network device of claim 8, wherein the device token includes a token string,
    wherein the token string includes one or more of the application identifier or the information identifying the user device, and
    wherein the one or more processors are further configured to:
        store information associating the token string with one or more of the application identifier or the information identifying the user device in a data structure stored in a memory associated with the network device.

20. The communication system of claim 14, wherein the device token includes a token string,
    wherein the token string includes one or more of the application identifier or the information identifying the user device, and
    wherein the subscriber profiler controller is further configured to:
        store information associating the token string with one or more of the application identifier or the information identifying the user device in a data structure stored in a memory associated with the subscriber profiler controller.

* * * * *